Aug. 7, 1962 W. V. CHERY 3,048,058
TRANSMISSION
Filed April 27, 1960
FIG. 2
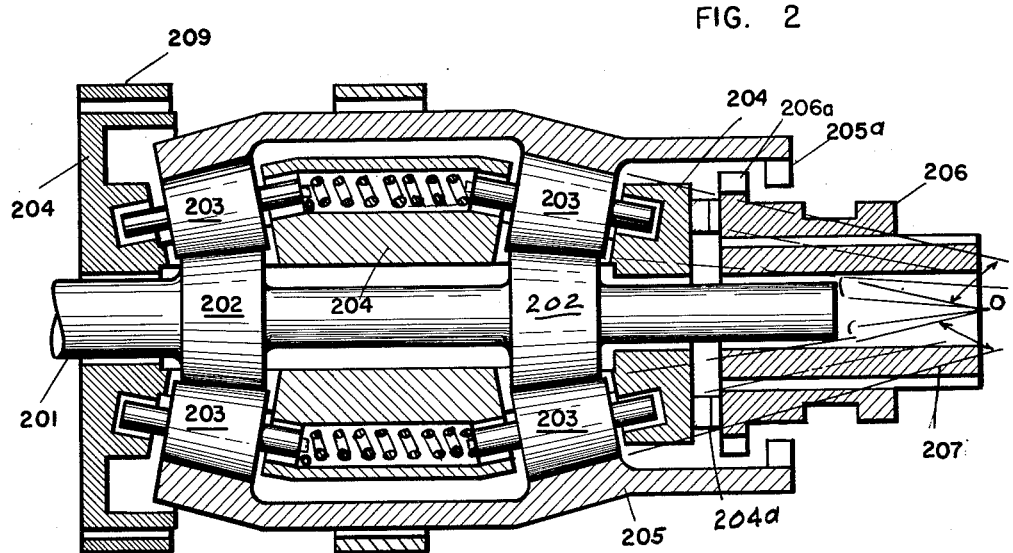
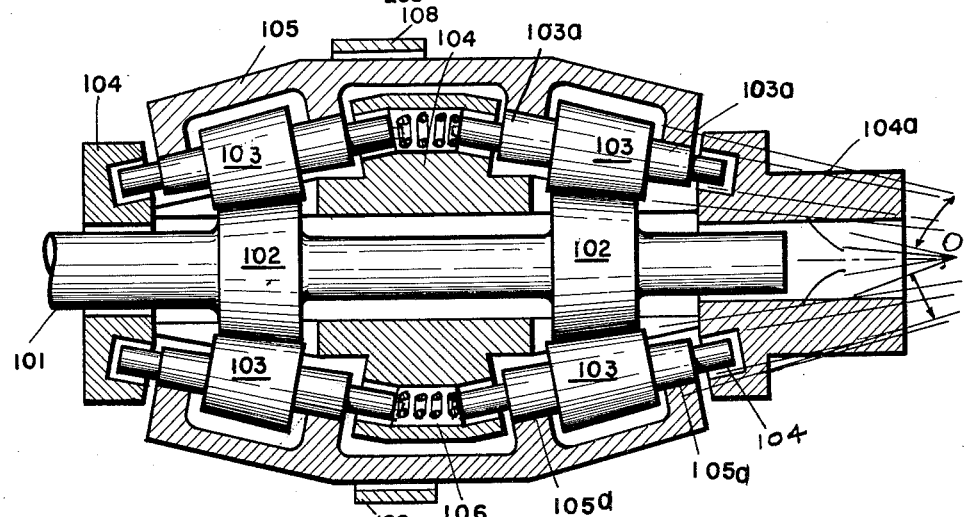
FIG. 1
INVENTOR.
WALTER VALDEMAR CHERY
BY
*Charles L. Lovenwheel*
attorney 3,048,058
Patented Aug. 7, 1962

3,048,058
TRANSMISSION
Walter Valdemar Chery, 908 Fairview Ave.,
Meadville, Pa.
Filed Apr. 27, 1960, Ser. No. 24,925
6 Claims. (Cl. 74—798)

This invention relates to transmissions and, more particularly, to planetary transmissions of the friction type.

It is, accordingly, an object of the present invention to provide a transmission of the type described wherein a considerable range of speed reduction is possible.

Another object of the invention is to provide a transmission which will have a minimum amount of slippage during operation.

A further object of the invention is to provide an improved transmission.

Yet a further object of the invention is to provide a transmission wherein the planetary rollers exert a balanced force on the sun rollers and ring rollers.

Still a further object of the invention is to provide a planetary transmission which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an outline view of a cross section of a transmission according to the invention; and FIG. 2 is a view similar to FIG. 1 of another embodiment of the invention.

Now with more particular reference to the drawings, FIG. 1 shows a friction power transmission for use where a great ratio of reduction is required but where space is limited. The transmission has an input shaft 101 and an output hub 104a. The transmission consists of a set of planetary tapered rolls 103 which are preloaded by springs 106 which urge the rolls 103 in opposite directions to each other. Therefore, the system is balanced.

The large diameter portions of the planetary rolls 103 are in linear rolling contact with sun rolls 102. The rolls 102 are integral with and are a part of the input shaft 101. The small diameter portions of planetary rolls 103a are in linear contact with the inside race indicated at 105a of an outer ring housing 105. Brake 108 may function as a reaction member to hold the ring gear against rotation. The planetary sun rolls 102 and rolls 103 are in the form of a frustoconical surface developed from the center 0 as shown and the outside surfaces of the rolls 102 and 103 converge at 0.

A cage 104 has the central part which carries the inner ends of the planetary rolls in suitable bearings with the springs 106 therein. The outer end of the cage 104 is fixed to the inner part. The outer part has suitable anti-friction bearings to carry the outer ends of the planetary rolls.

Due to the difference in diameters of the planetary rolls at the contact points, the regular ratio of the planetary drive is increased in proportion $$\frac{d}{do}$$

where $d$ is the large diameter of the planetary roll and $do$ is the small diameter of the planetary roll.

The cage 104 of the planetary rolls has the hub 104a which is the output of the transmission.

If it is desired to have rotation of the output opposite of the input, then the cage 104 of the planetary rolls may be held stationary and the outer ring housing 105 serves as an output.

FIG. 2 shows a power transmission suitable for use when the speed ratio desired is not great. In this case, the planetary rolls have a uniform shape over their entire length and the same surfaces of the planetary rolls contact the outer ring as contact the sun rolls with no extra reduction. The function is identical as described in connection with FIG. 1.

A cage 204 has the intermediate part which carries the inside ends of the planetary rollers in suitable bearings. The outer portions of the cage 204 are fixed to the inner portions and suitable anti-friction bearings support the outer ends of the planetary rollers. The springs shown urge the planetary rolls away from each other.

When the transmission is used where reverse speed is involved, for instance in marine application, it could be easily adapted as shown in FIG. 2. In this design, both the planetary cage 204 and an outer ring 205 can be engaged or disengaged with positive clutch teeth 206a. A suitable shifting fork may be provided to shift a clutch 206.

In the forward position, the outer ring 205 is locked by a brake band 208 and the planetary cage 204 is engaged by the positive clutch 206 through teeth 204a which engage similar teeth on the cage 204. The positive clutch 206 is engaged at all times with a shaft 207 by the splined type joint between the shaft 207 and the clutch 206.

In reverse, the planetary cage 204 is locked by a brake band 209 and power is transmitted through the outer ring 205, the clutch teeth 205a and 206a, the clutch 206, and the shaft 207.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A planetary transmission comprising first and second planetary rolls, a ring housing having an internal ring surface for said first planetary rolls and an internal ring surface for said second planetary rolls, a shaft, said ring surface for said first rolls inclined toward the output end and toward said shaft and said ring surface for said second rolls inclined toward the input end and toward said shaft, said shaft having spaced frustoconical shaped sun rolls fixed to said shaft with the large ends of said sun rolls toward each other, said planetary rolls having an outside surface in rolling contact with said sun rolls, said planetary rolls being in rolling contact with said ring surfaces, a planetary cage carrying said planetary rolls, a drive shaft fixed to said planetary cage, and a compression spring disposed between each said first planetary roll and each said second planetary roll and urging said first planetary rolls away from said second planetary rolls, urging said planetary rolls symmetrically into engagement with said ring surfaces and the surfaces of said sun rolls.

2. A transmission comprising a ring housing, an input and an output, and a reaction member, said ring housing comprising said reaction member, said input comprising a planetary cage, two spaced rows of planetary rolls on said cage, each said roll having a bearing surface on each opposite end thereof journalled in said cage and a spaced reduced size peripheral surface on each said planetary roll, and spaced sun rolls fixed to said output, the surface of one said sun roll converging toward a point, said reaction member engaging said ring housing, the surfaces of said planetary rolls also converging toward said point, said spaced reduced size surface of each of said planetary rolls being in rolling contact with the inside surface of said ring housing.

3. The transmission recited in claim 2 wherein the surface of said rolls engaging said ring housing has a smaller diameter than the surface engaging said sun rolls.

4. The transmission recited in claim 1 wherein the same surface of said planetary rolls which engages said sun rolls also engages said ring housing.

5. The transmission recited in claim 4 wherein means is provided to lock said planetary cage against rotation and to connect said ring housing to said input to drive it therewith, and means is also provided to connect said input to said planetary cage and to lock said ring housing against rotation.

6. A planetary transmission having an input and an output end comprising first and second planetary rolls, a ring housing having an internal ring surface for said first planetary rolls and an internal ring surface for said second planetary rolls, reaction means to hold said ring housing against rotation, a shaft adapted to be an output, said ring surface for said first rolls inclined toward the output end and toward said shaft and said ring surface for said second roll inclined toward the input end and toward said shaft, said shaft having spaced frusto-conical shaped sun rolls fixed thereto with the large ends of said sun rolls toward each other, said planetary rolls having an outside surface in rolling contact with said sun rolls, said planetary rolls being in rolling contact with said ring surfaces, a planetary cage carrying said planetary rolls, a drive shaft fixed to said planetary cage, and a compression spring disposed between said first planetary rolls and each said second planetary roll and urging said first planetary rolls away from said second planetary rolls, urging said planetary rolls symmetrically into engagement with said ring surfaces and the surfaces of said sun rolls.

References Cited in the file of this patent

UNITED STATES PATENTS

| 1,201,364 | Shelton | Oct. 17, 1916 |

FOREIGN PATENTS

| 112,015 | Great Britain | Jan. 22, 1919 |
| 450,292 | Italy | July 12, 1949 |
| 1,072,329 | France | Mar. 17, 1954 |